United States Patent [19]

Chen et al.

[11] 4,317,893
[45] Mar. 2, 1982

[54] OIL RECOVERY BY WATERFLOODING EMPLOYING AN ANIONIC POLYMERIC SURFACTANT CONTAINING RECURRING SUCCINIMIDE OR SUCCINAMIDE GROUPS

[75] Inventors: Catherine S. H. Chen, Berkeley Heights; Edward W. Sheppard, Lambertville, both of N.J.

[73] Assignee: Mobil Oil Corporation, New York, N.Y.

[21] Appl. No.: 200,228

[22] Filed: Oct. 24, 1980

Related U.S. Application Data

[62] Division of Ser. No. 954,844, Oct. 26, 1978, Pat. No. 4,284,517.

[51] Int. Cl.³ .............................................. C08L 33/02
[52] U.S. Cl. .............................. 525/328; 252/8.55 D; 525/340; 525/351; 525/380; 525/382
[58] Field of Search ............... 525/328, 329, 340, 353, 525/375, 380, 382, 351; 526/272; 252/51.5 A

[56] References Cited

U.S. PATENT DOCUMENTS

| | | | |
|---|---|---|---|
| 2,490,677 | 12/1949 | Cupery | 525/328 |
| 2,977,334 | 3/1961 | Zopf et al. | 525/328 |
| 3,432,479 | 3/1969 | Verdol | 525/328 |
| 3,506,625 | 4/1970 | Patinkin | 525/328 |
| 3,520,852 | 7/1970 | Pratt | 525/328 |
| 3,684,777 | 8/1972 | Field | 525/328 |
| 3,714,045 | 1/1973 | Frangatos | 525/328 |
| 3,880,811 | 4/1975 | Kaupp | 525/328 |
| 3,933,761 | 1/1976 | Coleman | 525/328 |
| 4,065,435 | 12/1977 | Sakaguchi | 525/328 |
| 4,113,632 | 9/1978 | Stournas et al. | 260/501.21 |
| 4,124,512 | 11/1978 | Stournas et al. | 260/501.21 |

Primary Examiner—Paul R. Michl
Attorney, Agent, or Firm—Charles A. Huggett; James F. Powers, Jr.; Hastings S. Trigg

[57] ABSTRACT

A method for the recovery of oil from an oil-containing subterranean formation by waterflooding employing as an injection medium an aqueous solution of an anionic polymeric surfactant formed by reacting a polymer including succinic anhydride moieties with a primary amine to provide a polymeric reaction product in which at least 20 mol percent of the anhydride moieties have been converted, by reaction with said amine, to succinimide or succinamide groups. The polymeric anionic surfactants of the invention exhibit good physical and chemical stability, are shear stable, are effective in maintaining the salt stability of other surfactants (such as petroleum sulfonates) and also function as viscosifiers, even in the presence of significant concentrations of divalent metal ions. According to a preferred form of the invention, the surfactants comprise the reaction product of a copolymer of styrene and maleic anhydride and triethylammonium aniline disulfonate, in which reaction product from 20 mol percent to 40 mol percent of the anhydride moieties have been converted to succinimide or succinamide groups.

8 Claims, 2 Drawing Figures

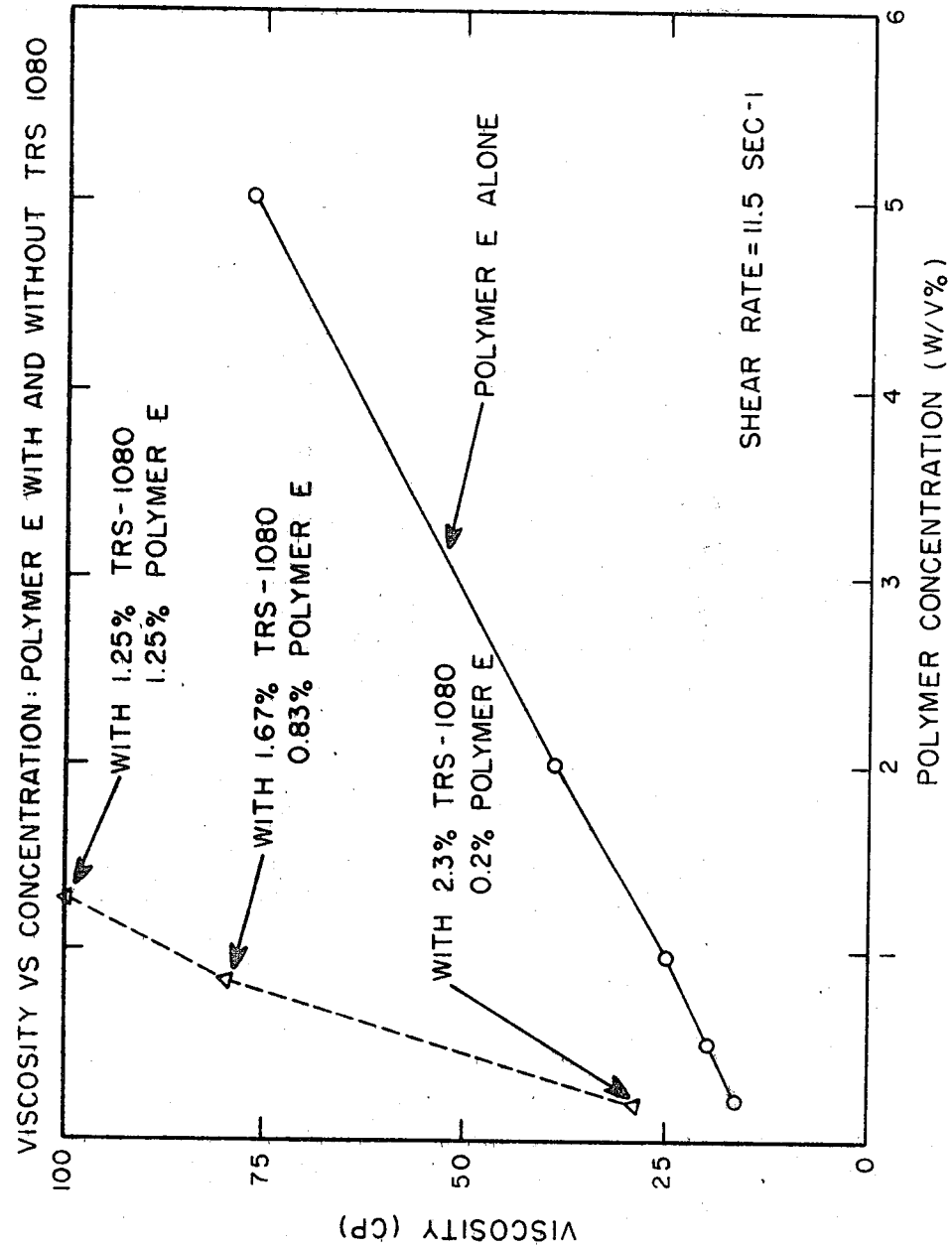

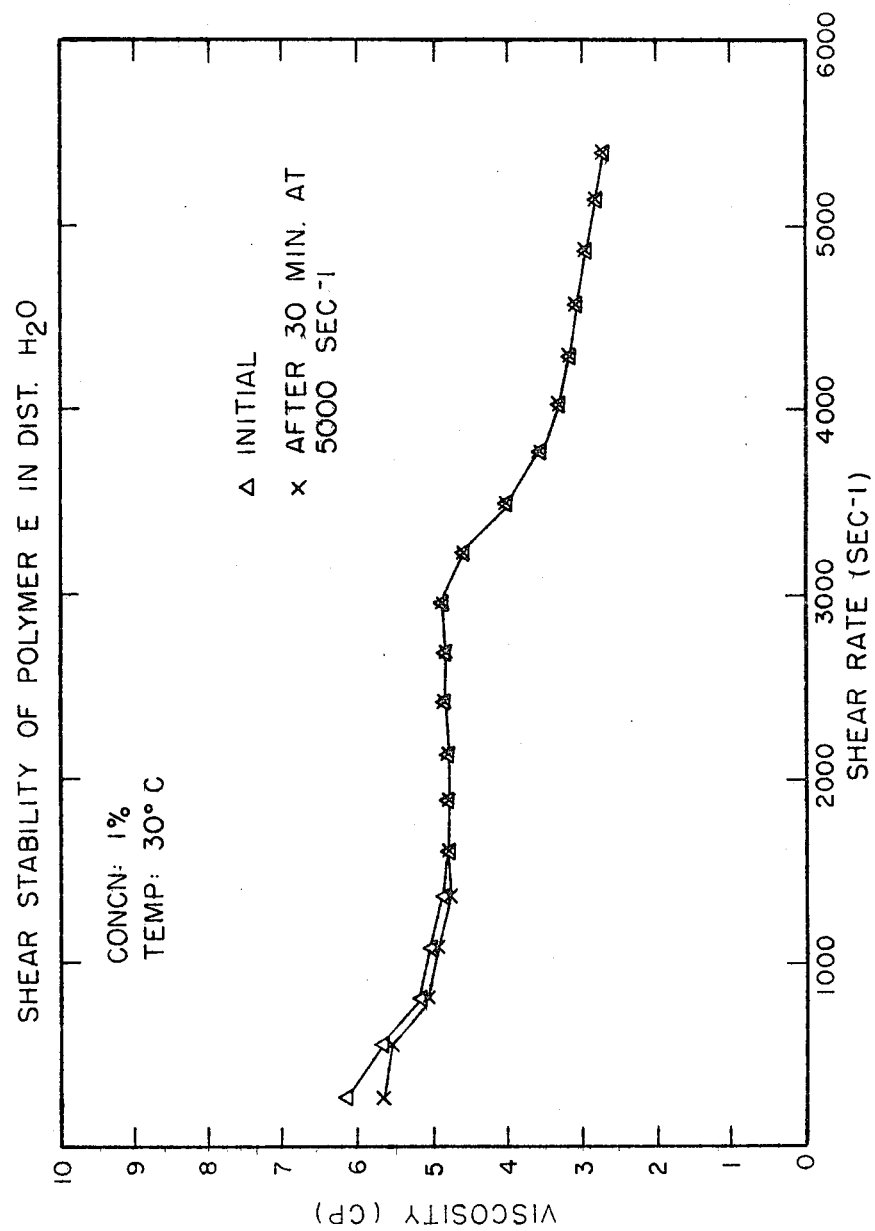

OIL RECOVERY BY WATERFLOODING EMPLOYING AN ANIONIC POLYMERIC SURFACTANT CONTAINING RECURRING SUCCINIMIDE OR SUCCINAMIDE GROUPS

CROSS-REFERENCE TO RELATED APPLICATION

This is a division of copending application Ser. No. 954,844, filed Oct. 26, 1978 now U.S. Pat. No. 4,284,517.

BACKGROUND OF THE INVENTION

This invention relates to an additive useful in the recovery of oil from subterranean reservoirs and, more particularly, is concerned with additives for improved waterflooding operations involving the use of succinimide or succinamide subunit-containing polymers containing ionic groups, which polymers are stable to high aqueous salt concentrations and which function as viscosifiers, co-surfactants, and modifiers capable of improving the performance of other surfactants and viscosifiers.

In the recovery of oil from oil-bearing reservoirs, it is usually possible to recover only a minor portion of the original oil in place by the so-called primary recovery methods, which methods utilize only the natural forces present in the reservoir. Thus, a variety of supplemental recovery techniques have been enployed in order to increase the recovery of oil from subterranean reservoirs. In these supplemental techniques, which are commonly referred to as secondary recovery operations, although in fact they may be primary or tertiary in sequence of employment, fluid is introduced into the reservoir in order to displace the oil therein to a suitable production system through which the oil may be drawn to the surface of the earth. The displacing medium may be a gas, an aqueous liquid such as fresh water or brine, an oil-miscible liquid such as butane, or a water and oil-miscible liquid such as an alcohol. The most widely used supplemental recovery technique is waterflooding which involves the injection of water into the reservoir.

It has long been recognized that various factors such as the interfacial tension between the injected water and the reservoir oil, the relative mobility and viscosity of the injected water with respect to the oil, and the wettability characteristics of the subterranean rock surfaces influence the amount of oil recoverable by waterflooding. Thus, the addition of surfactants to the flood water may result in a lowering of the oil-water interfacial tension and/or alter the wettability of the entrapping rock. Similarly, the addition of viscosifiers to all or part of the injected water increases the viscosity of the aqueous phase, thus decreasing the mobility ratio between it and the oil, and improving the sweep efficiency of the waterflood.

Processes which involve the injection of aqueous surfactant solutions in order to reduce the oil-water interfacial tension are commonly referred to as low tension waterflooding processes. Thus far, most low tension waterflooding applications have employed anionic surfactants. For example, a paper by W. R. Foster entitled "A Low Tension Waterflooding Process", Journal of Petroleum Technology, Vol. 25, February 1973, pages 205–210, describes a promising technique involving the injection of an aqueous solution of petroleum sulfonates within designated equivalent weight ranges under controlled conditions of salinity. The petroleum sulfonate slug is followed by a thickened water slug which contains a viscosifier such as a water-soluble biopolymer in graduated concentration in order to provide a maximum viscosity greater than the viscosity of the reservoir oil and a terminal viscosity near that of water. This thickened water slug is then followed by a driving fluid such as a field brine which is injected as necessary to carry the process to conclusion.

A major limitation to the use of surfactant in waterflooding operations is the tendency of the surfactant to precipitate from solution when exposed to moderate or high salt concentrations. Thus, as taught in the Foster paper, it may be necessary to precede the waterflooding medium with a slug of low-salt water to displace reservoir waters containing unacceptably high concentrations of salts. In addition to the gross precipitation of surfactant realized in high salt environments, surface active performance of the surfactant is affected adversely by salt concentrations, even concentrations below those which cause precipitation. Consequently, in aqueous environments with salt concentrations as low as 2 to 3 weight percent, it is difficult to achieve the desired low interfacial tension. Thus, even with the use of a protective low-salt slug of water prior to injection of the surfactant solution, it is difficult in some cases to achieve the desired results. A number of recent patents are directed to low tension waterflooding and surfactant systems which tolerate relatively high salinities and/or divalent metal ion concentrations. For example, U.S. Pat. No. 3,811,504—Flournoy et al, is directed to a low tension waterflooding process for use in environments exhibiting a polyvalent ion concentration of about 1500 to about 12,000 parts per million which employs a three-component surfactant system containing two anionic surfactants, one of which is an alkyl or alkylaryl sulfonate; the other anionic surfactant is an alkyl polyethoxy sulfate containing from 1 to 10 ethoxy groups and from 7 to 20 carbon atoms in the alkyl group. The nonionic surfactant may be a polyethoxylated alkyl phenol or a polyethoxylated aliphatic alcohol.

U.S. Pat. No. 3,508,612—Reisberg et al is directed to a low tension waterflooding process employing a calcium-compatible anionic-anionic surfactant system which can be employed in saline solutions containing from 0.01 to 5 molar NaCl and from about 0 to 0.1 molar $CaCl_2$. One of the anionic surfactants employed in the Reisberg et al process is an organic sulfonate such as petroleum sulfonate having an average molecular weight within the range of 430–470, and the other surfactant is a sulfated ethoxylated alcohol. A preferred sulfated alcohol is one containing a $C_{12}$–$C_{15}$ alkyl group and three ethylene oxide groups.

Another technique involving the use of calcium-compatible surfactant systems in low tension waterflooding is disclosed in U.S. Pat. No. 3,827,497—Dycus et al. In that patent, the patentees disclose a process in which a three component or a two component surfactant may be employed. The three component system comprises an organic sulfonate surfactant such as petroleum sulfonate, a polyalkylene glycol alkylether, and a salt of a sulfonate or sulfated oxyalkylated alcohol. The two component system comprises an organic sulfonate surfactant and a salt of a sulfonated oxyalkylated alcohol. These surfactant systems may be employed in a brine solution which will usually contain about 0.5–8% sodium chloride and will often contain 50–5,000 parts per million polyvalent metal ions such as calcium and magnesium ions.

In U.S. application Ser. No. 719,135 filed Aug. 31, 1976 and assigned to the assignee of this invention, there are disclosed succinimido arylsulfonate compounds as surfactants in waterflooding operations. In the materials of that application, however, the succinic functions are not repeating subunits of a polymeric species.

Notwithstanding the improvements in the art relating to improved surfactant compositions, materials which may serve to modify existing surfactants to improve their stability and efficiency in moderate to high aqueous salt environments are highly desirable.

One difficulty which often is encountered in secondary recovery operations is the relatively poor sweep efficiency of the injected displacing liquid. That is, the displacing liquid exhibits a tendency to channel through certain portions of the reservoir and to bypass other portions. Such poor sweep efficiency is usually occasioned by differences between the viscosity of the injected displacing medium and in situ reservoir oil and also by permeability variations within the reservoir. The reservoir may comprise a plurality of fairly well-defined zones of widely diverse permeabilities. The injected displacing fluid preferentially flows through the more permeable zones of the reservoir thus leading to premature breakthrough of the displacing fluid at the production well or wells.

Even when the reservoir exhibits a relatively uniform permeability throughout, a situation referred to as instability fingering may develop in those instances where the viscosity of the injected displacing fluid is significantly less than the viscosity of the in situ reservoir oil. In this situation, the less viscous displacing fluid tends to develop fingers or bulges which may be caused by points of minute heterogeneity in the reservoir. These fingers of displacing fluid tend to become extended in the direction of flow and travel at a faster rate than the remainder of the injected fluid, thus again resulting in premature breakthrough at the production system.

Various means have been proposed for improving the sweep efficiency of injected displacing fluids in waterflooding operations by increasing the viscosity of those fluids. This may be done prior to injection into the substratum, or may be performed in situ in order to avoid a reduction in injectivity at the injection site. For example, in U.S. Pat. No. 3,208,518 to Patton, there is disclosed a waterflooding process wherein the viscosity of the flooding medium is increased in situ through the use of high molecular weight polymers such as ionic polysaccharides produced by bacterial fermentation.

U.S. Pat. Nos. 3,677,961—Browning et al; 3,727,687—Clampitt, 3,215,634—Walker and 3,697,498—Browning et al disclose various cross-linked polysaccharides as being useful as viscosifiers in waterflooding operations. In addition, U.S. application Ser. No. 708,727, filed July 26, 1976, now U.S. Pat. No. 4,096,074 and assigned to the assignee of the present invention, discloses viscosifiers composed of cross-linked polysaccharides which are relatively stable to high concentrations of divalent metal ions.

None of these references disclose the novel polymers of the present invention which serve both as viscosifiers and as modifiers which improve the salt stability of waterflooding surfactants.

SUMMARY OF THE INVENTION

In accordance with the present invention, there is provided a new and improved oil recovery process wherein an aqueous solution of a polymeric anionic surfactant, as more fully described below, is injected into an oil-containing subterranean formation to improve the efficiency of the waterflood. The invention is practiced in subterranean reservoir which is penetrated by spaced injection and production systems defining a recovery zone of the reservoir. In carrying out the invention, an aqueous driving agent containing the polymeric, anionic surfactant to the invention is injected into the reservoir through the injection system. The injected aqueous medium causes displacement of the trapped oil from the rock stratum of the recovery zone of the reservoir, which oil may then be recovered via the production system.

The polymeric, anionic surfactants employed in accordance with the invention are particularly suitable for use in reservoirs in which the connate waters exhibit a high divalent metal ion concentration or in waterfloods in which the available injection waters exhibit a relatively high divalent ion concentration. The polymeric anionic surfactants of the invention exhibit good physical and chemical stability, are effective in maintaining the salt stability of other surfactants (i.e., function as co-surfactants, drastically improving the brine stability of other, more sensitive surfactants such as petroleum sulfonates), and also function as viscosifiers, even in the presence of significant concentrations of divalent metal ions.

Generally speaking, the polymeric surfactants useful in the practice of the invention are formed by reacting a polymer including succinic anhydride moieties with a primary amine to provide a water soluble, polymeric reaction product in which at least 20 mol percent, and preferably from 20 to about 40 mol percent, of the anhydride moieties have been converted, by reaction with said amine, to succinimide, succinamic acid, and/or succinamide groups. For convenience, the succinamic acid and succinamide moieties will be referred to, collectively, as succinamides.

The polymers containing succinic anhydride moieties useful in the production of the polymeric, anionic, surfactants of the invention will, in general, be formed of structural units of the formula

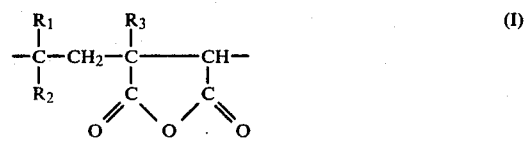

wherein $R_1$ and $R_2$ are the same or different and are selected from the group consisting of hydrogen or alkyl radicals, linear or branched, including up to about 50 carbon atoms such as, for example, methyl, ethyl, propyl, hexyl, methylhexyl, trimethyl butyl, cyclohexyl, tetradecyl, pentacosyl, tetracontyl and pentracotyl, etc. radicals; aryl, alkyaryl and aralkyl radicals including up to 50 carbon atoms such as, for example, phenyl, diphenyl, naphthyl, anthracyl, tolyl, xylyl, ethylphenyl, phenylbutyl, benzyl, etc. radicals; $R_3$ is hydrogen or is of the formula

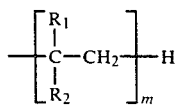

(II)

wherein $R_1$ and $R_2$ have the meanings given above and m is from 1 to 25.

Such polymers are generally copolymers in which one monomer is a substituted or unsubstituted maleic anhydride such as, for example, maleic anhydride itself or an alkyl alkaryl or aralkyl maleic anhydride of the formula

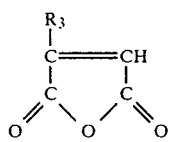

(III)

where $R_3$ has the meaning given above. It will be appreciated that the maleic anhydride moiety may itself be a part of a polymer, such as where $R_3$ is of the formula

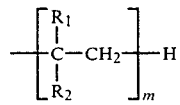

(II)

wherein $R_1$, $R_2$, and m having the meanings given above.

The second sub-unit of the base polymer useful in the production of the polymeric anionic surfactants of the invention may be derived from a monomeric species having the formula

(IV)

wherein $R_1$ and $R_2$ have the meanings given above. Thus, the comonomer to be reacted with the maleic anhydride or the substituted maleic anhydride may be, for example, ethylene, propylene, butylene, styrene, ring-substituted alkyl styrene and similar materials.

The base copolymers including the succinic anhydride moieties may be formed from their constituent monomers by following the procedures of Ohno et al, 11 *Journal of Polymer Science* page 13 (1973). Other procedures which may be used to produce such copolymers will readily occur to those skilled in the art.

The primary amine reactants useful in the production of the polymeric, anionic surfactants of the invention will, in general, conform to the formula $(Y)_n—R_4—NH_2$ (V)

wherein $R_4$ is selected from the group consisting of alkyl, aryl, alkaryl and aralkyl radicals including up to 50 carbon atoms, such as, for example, the radicals referred to in connection with the definition of $R_1$ and $R_2$ above, n is a whole number from 1 to 3, and Y is selected from the group consisting of

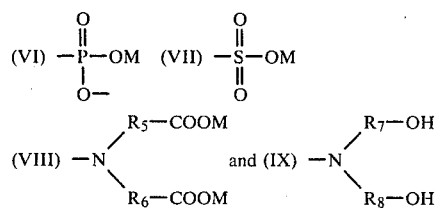

wherein $R_5$, $R_6$, $R_7$ and $R_8$ are alkylene radicals including up to 50 carbon atoms, and M is selected from the class consisting of hydrogen and alkali and alkaline earth metals such as, for example, lithium, potassium, sodium, calcium, magnesium, strontium, etc.; or ammonium ($NH_4+$) or substituted ammonium such as, mono, di, or tri-substituted alkyl or alkanol ammonium. Preferably, M is a substituted ammonium ion having the formula

(X)

where $R_9$, $R_{10}$, $R_{11}$ are the same or different and are selected from the class consisting of hydrogen, $R_{12}$ and at least one carbon atom connected through $R_{12}$ such that $$-\underset{|}{\overset{|}{N}}+-R_{12}$$ (XI)

forms a heterocyclic ring, and $R_{12}$ is selected from the class consisting of alkyl and hydroxyalkyl groups containing a total up to 10 carbon atoms.

The primary amine reactants useful in the production of the anionic polymeric surfactants of the invention may thus be either aliphatic or aromatic amines such as methyl, butyl, dodecyl, cyclohexyl, benzyl, phenylethyl or phenylbutyl amines; aniline, alkyl substituted aniline in which the alkyl group contains up to 25 carbon atoms, or polynuclear amines such as naphthylamine, which contain the ionic functionalities illustrated in formulas VI, VII, VIII and IX above.

Specific examples of the amine reactants useful in the practice of the invention are aniline 2-sulfonic acid, aniline-2, 4-disulfonic acid, aniline-2,4,6-trisulfonic acid, aniline-3-sulfonic acid, aniline-3,5,disulfonic acid, 4-methylaniline-2-sulfonic acid, 2-butylaniline-2,4-disulfonic acid, a-amino-1,5-naphthalene disulfonic acid, 7-amino-1, 3-naphthalene-disulfonic acid, 4-amino-1-naphthalene sulfonic acid, 5-amino-1-naphthalene sulfonic acid, benzylamine-2-sulfonic acid, benzylamine-2,4-disulfonic acid, cyclohexyl amine sulfonic acid, butylamine-sulfonic acid and dodecylamine-mono- di- and tri-sulfonic acids.

Examples of substituted ammonium ions falling within the scope of formula X above are methyl ammonium, ethyl ammonium, isopropyl ammonium, triethyl ammonium, monoethanol ammonium, diethanol ammonium, triethanol ammonium, as well as nitrogen containing ions such as those derived from heterocyclic nitrogen compounds such as, for example, pyridine, morpholine, piperazine, pyrimidine and imidazole.

Compounds analogous to the above sulfonic acids wherein the sulfonic acid moieties are replaced by phosphorous acid, amino acid, or amino alcohol functionalities as shown in formulas VI, VIII, and IX above, may also be used in the production of the anionic polymeric surfactants useful in the practice of the invention. Analogous compositions wherein the hydrogens of the acid of alcohol functionalities are replaced by ammonium, substituted ammonium, alkali metal or alkaline earth metal are also included.

In general, the anionic polymeric surfactants useful in the practice of the invention may be formed by reacting the polymer of formula I above with the primary amine containing an anionic group or groups, such as illustrated in formula V above, in a suitable solvent under conditions of time and temperature such that at least 20 mol percent, and preferably from 20 to 40 mol percent of the succinic anhydride functionalities react with the primary amines to form succinimide or succinamide groups. Water is produced as a by-product. Disappearance of the anhydride is conveniently monitored by infrared spectrometry, allowing cessation of the reaction at the desired anhydride level to be detected.

Generally speaking, the reaction temperature is maintained in the range of about 60° C. to about 180° for times ranging from 16 hours to three days. As will be appreciated by those skilled in the art, the selection of time and temperature is not critical. The time necessary for completion of the reaction will be related both to the solvent selected and to the tempeature selected for the reaction. Suitable solvents useful in the production of the anionic polymeric surfactants of the invention include acetonitrile, dimethylformamide, and dimethylsulfoxide. Other suitable solvents will readily occur to those skilled in the art. The use of a system of water removal may facilitate the reaction in some solvent systems. Thus, water may be removed azeotropically or by molecular sieves in methods well known in the art. The use of such water removal systems is optional, however.

In accordance with a preferred form of the invention, the anionic polymeric surfactants of the invention are employed in the flooding water in an amount sufficient to reduce the oil-water-interfacial tension to a value significantly less than 0.1 dyne per centimeter. Preferably, the oil-water interfacial tension is reduced to a value of 0.005 dyne per centimeter or less, in order to reach an optimum microscopic displacement efficiency. In some cases, a total concentration of as low as 0.05% by weight of the surfactant will be satisfactory. Generally speaking, a total concentration ranging from about 0.1% to about 5% by weight, and preferably from about 1% to about 3% by weight, is employed.

In a further embodiment of the invention, the anionic, polymeric surfactants of the invention are employed with a hydrocarbon sulfonate surfactant, such as a petroleum sulfonate, which normally precipitates in the presence of even moderate concentrations of divalent metal ions, such as calcium and magnesium. Accordingly, there is provided in accordance with one form of the invention a method of increasing the stability of an anionic sulfonate surfactant in the presence of sodium, calcium or magnesium ions which comprises admixing said surfactant with the anionic, polymeric surfactant of the invention, as above described. In this connection, it has been found that the polysulfonates, and particularly the disulfonates, are most effective in their ability to stablize other hydrocarbon sulfonates, such as petroleum sulfonates, for example. In addition, it has been found that the stabilization effectiveness may be enhanced where the cation (M) associated with the succinimide or succinamide groups of the polymer is in the form of substituted ammonium, e.g., triethyl ammonium, rather than the alkali or alkaline earth metal.

The hydrocarbon sulfonate whose stability in the presence of divalent metal ions may be increased in accordance with the invention can be any of those widely available commercially under the trade names such as "Bryton Chemical F468", "Witco Chemical TRS-10" "American Cyanamid Aerosol OT" and many others. They are usually, and preferably, metal salts of alkylaryl sulfonates, preferably alkaline earth metal salts of alkylbenzene sulfonates containing from 12 to 30 carbon atoms, but can also be sulfocarboxylate salts, aliphatic sulfonates, alkylated naphthalene sulfonates and the like, the essential requirement being that it have surfactant properties. The cationic portion can be an alkali or alkaline earth metal, ammonium, or substituted ammonium, such as, for example, M in the above formulae. Generally, the cationic portion is usually sodium. The molecular weight of this hydrocarbon sulfonate surfactant is usually in the range of 300–600, more frequently 350–525. These materials can be prepared by well-known procedures such as those described in U.S. Pat. No. 3,308,068. They can be prepared synthetically or can be those prepared from petroleum and commonly known as petroleum sulfonates.

In general, the amount of anionic, polymeric surfactant that is admixed with another anionic hydrocarbon sulfonate to increase its stability in the presence of divalent metal ions may vary within wide limits, depending upon the concentration of divalent metals ions to which the mixture is to be exposed. Generally speaking, the weight ratio of the anionic, polymeric surfactant of the invention to the hydrocarbon sulfonate will range from 1:30 to 2:1 and preferably from 1:10 to 1:1. Aqueous solutions of such mixtures may be used in waterfloods in which the subterranean formation contains a divalent ion concentration of from 500 to 20,000 parts per million. Alternatively, such mixtures may be admixed with available injection waters exhibiting a divalent ion concentration of from 500 to 20,000 parts per million.

In order that those skilled in the art may better understand how the novel surfactants of the present invention may be prepared the following examples are given by way of illustration and not by way of limitation.

EXAMPLE 1

The succinimide or succinamide of styrene-maleic anhydride copolymer (Base polymer) and triethylammonium aniline disulfonate was prepared by reacting 10 gr. of a 1:1 styrenemaleic anhydride copolymers formed via the method of Ohno et al, "Journal of Polymer Science", p. 413, (1973), with 38.5 gm of the disulfonate in 200 ml. acetonitrile with water removal via azeotropic distillation. The initial homogeneous reaction mixture was refluxed until no more water azeotroped from the mixture. Fresh dry acetonitrile was added from time to time to make up lost volume. An alternative method of removing water was to reflux the acetonitrile over 4-Å molecular sieve in a Sohxlet extractor during the reaction. The reaction took up to four days. The product polymer separated out as a swollen gel as the reaction proceeded. When the reaction mixture was cooled, the main part of the product precipitated and was recovered by filtration. The filtrate was stripped off of the solvent to recover the rest of the product. The combined product was dissolved in distilled water and dialyzed against distilled water to remove all non-polymeric material. The product was recovered by lyophilization.

EXAMPLE 2

The reaction of Example 1 was carried out in dimethyl formamide with no attempt made to remove the water of reaction. The reaction was followed by infrared spectrometry until no further diminution in the anhydride peak could be detected, usually 3–4 days. The reaction was run in several batches at 65° C., 75° C., and at reflux. Product recovery via dialysis and lyophilization was performed as in Example 1.

EXAMPLE 3

The reaction of Example 1 with the substitution of the sodium salt of aniline disulfonic acid was performed in dimethylsulfoxide. The reaction was carried out at reflux temperature for 3–4 days. The polymer was isolated by dialysis followed by lyophilization as in Example 1.

EXAMPLE 4

For purposes of comparison, a 1:1 copolymer of styrene and maleic anhydride was not reacted with an amine, but was hydrolyzed into di-acid form. The suspension of the copolymer in 1 N NaOH solution effectuated the hydrolysis. The solution was dialyzed to remove the excess base followed by acidification with hydrochloric acid to convert the disodium salt to the diacid. The acidified polymer precipitated out as a white powdery material. Excess hydrochloric acid was removed by dialysis against distilled water. When the solution became neutral, the polymer was soluble, and was recovered by lyophilization.

Reaction data for examples 1 to 4 are included in Table I. From this table it can be concluded that the highest efficiency of conversion is attainable in acetonitrile with the employment of a system for water removal. Molecular weight data of the polymers were determined by measurement of intrinsic viscosity as taught by Endo et al, Journal of Polymer Science A-2, Vol. 6, 665 (1968).

Brookfield viscosimeter or an Haake Rotovisco RV-3. Product polymers representing a conversion of from 20 to 40 mol percent of the anhydride groups to succinimide or succinamide groups exhibited significant enhancement in viscosity. In brine solution, the viscosity increase was less, but still significant.

TABLE IIA

BROOKFIELD VISCOSITY IN DISTILLED WATER OF POLYMER A

Initial ST-MA copolymer mol. wt.: $2.1 \times 10^5$
Degree of conversion: 40 mole percent
Calculated final mol. wt.: $3.8 \times 10^5$

| Shear Rate Sec$^{-1}$ | 0.125% (w/v) R.T. | 0.125% (w/v) 89° C. | 0.25% R.T. | 0.25% 89° C. | 0.5% R.T. | 0.5% 89° C. |
|---|---|---|---|---|---|---|
| 0.37 | 293 | — | 730 | 300 | >2000 | 244 Cp |
| 0.73 | 250 | — | 528 | 210 | >1000 | 110 |
| 1.84 | 210 | 28.4 | 392 | 130 | >400 | 65.6 |
| 3.67 | 171 | 20.0 | >200 | 97.6 | >200 | 44.8 |
| 7.34 | >100 | 15.6 | >100 | 61.6 | >100 | 33.0 |
| 14.7 | >50 | 11.7 | >50 | 35.6 | >50 | 24.6 |
| 36.7 | >20 | 8.2 | >20 | >20 | >20 | 19.3 |
| 73.4 | >10 | 6.8 | >10 | >10 | >10 | >10 |

TABLE IIB

BROOKFIELD VISCOSITIES IN DISTILLED WATER OF POLYMER G

Initial ST-MA copolymer mol. wt.: $4.0 \times 10^5$
Degree of conversion: 30 mole percent
Calculated final wt.: $6.4 \times 10^5$

| Shear Rate Sec$^{-1}$ | 0.125% (w/v) R.T. | 0.125% (w/v) 89° C. | 0.5% R.T. | 0.5% 89° C. |
|---|---|---|---|---|
| 0.37 | — | — | 170 | — |
| 0.73 | — | — | 156 | — |
| 1.84 | 42 | — | 135 | 37.6 |
| 3.67 | 38.6 | 11.2 | 122 | 31.2 |
| 7.34 | 35.7 | 10.4 | >100 | 27.5 |
| 14.7 | 32.1 | 6.5 | >50 | 23.0 |
| 36.7 | — | 7.8 | >20 | 17.8 |
| 73.4 | — | 6.6 | >10 | >10 |

TABLE IIC

BROOKFIELD VISCOSITIES IN DISTILLED WATER OF POLYMER E

Initial ST-MA copolymer mol. wt.: $2.1 \times 10^5$
Degree of Conversion: 25 mole percent

TABLE I

REACTION CONDITIONS AND CONVERSION

| POLYMER | EXAMPLE | Mol. Wt. of Starting Copolymer | Solvent | Temperature | H$_2$O Removal | Conversion, Mole % | Calculated Mol. Wt. of Final Copolymer |
|---|---|---|---|---|---|---|---|
| A | 1 | $2.1 \times 10^5$ | Acetonitrile | Reflux | Azeotrope | 40 | $3.8 \times 10^5$ |
| B | 1 | $2.1 \times 10^5$ | Acetonitrile | Reflux | Sieve | 40 | $3.8 \times 10^5$ |
| C | 2 | $2.1 \times 10^5$ | DMF | 65° C. | None | 20 | $3.0 \times 10^5$ |
| D | 2 | $2.1 \times 10^5$ | DMF | 75° C. | None | 35 | $3.6 \times 10^5$ |
| E | 2 | $2.1 \times 10^5$ | DMF | Reflux | None | 25 | $3.4 \times 10^5$ |
| F | 3 | $2.1 \times 10^5$ | DMSO | Reflux | None | 10 | $2.5 \times 10^5$ |
| G | 1 | $4.0 \times 10^5$ | Acetonitrile | Reflux | Azeotrope | 30 | $6.4 \times 10^5$ |
| H | 2 | $4.0 \times 10^5$ | DMF | 65° C. | None | 15 | $5.2 \times 10^5$ |
| J | 2 | $4.0 \times 10^5$ | DMF | 75° C. | None | 35 | $6.8 \times 10^5$ |
| K | 2 | $4.0 \times 10^5$ | DMF | Reflux | None | 35 | $6.8 \times 10^5$ |
| L | 3 | $4.0 \times 10^5$ | DMSO | Reflux | None | 10 | $4.8 \times 10^5$ |
| M | 4 | $4.0 \times 10^5$ | | | | 0 | $4.1 \times 10^5$ |

Viscosity date for polymer solutions in distilled waters at various concentrations, shear rates and temperatures are set forth in Tables IIA, IIB and IIC below. Similar data is presented for solutions of polymers in brine of various concentrations in Tables IIIA and IIIB below. The measurements were obtained utilizing a Calculated final mol. wt.: $3.4 \times 10^5$

| Shear Rate Sec$^{-1}$ | 5% (w/v) 30° C. | 5% (w/v) 60° C. | 2% 30° C. | 2% 60° C. | 1% 30° C. | 1% 60° C. | 0.5% 30° C. | 0.5% 60° C. |
|---|---|---|---|---|---|---|---|---|
| 2.30 | 51 | — | — | — | — | — | — | — |

TABLE IIC-continued
BROOKFIELD VISCOSITIES IN DISTILLED WATER OF POLYMER E Initial ST-MA copolymer mol. wt.: $2.1 \times 10^5$
Degree of Conversion: 25 mole percent
Calculated final mol. wt.: $3.4 \times 10^5$

| | Polymer Concn., Temperature, Viscosity | | | | | | | |
|---|---|---|---|---|---|---|---|---|
| | 5% (w/v) | | 2% | | 1% | | 0.5% | |
| Shear Rate Sec$^{-1}$ | 30° C. | 60° C. | 30° C. | 60° C. | 30° C. | 60° C. | 30° C. | 60° C. |
| 5.75 | 80.4 | 44.8 | 38.0 | — | — | — | — | — |
| 11.5 | 77.0 | 46.8 | 39.0 | 21.4 | 25.2 | — | 19.8 | — |
| 23.0 | 73.0 | 42.5 | 36.4 | 21.4 | 23.8 | 11.0 | 20.1 | 9.6 |
| 46.6 | >50 | 41.9 | 35.1 | 19.5 | 20.9 | 11.1 | 19.2 | 11.3 |
| 115 | >20 | >20 | >20 | 19.5 | >20 | 10.3 | 18.1 | 9.4 |
| 230 | >10 | >10 | >10 | >10 | >10 | 9.6 | >10 | 9.0 |

The thickening power of the anionic polymeric surfactants of the invention may be enhanced by admixing one or more of such materials with petroleum sulfonates. FIG. 1 of the drawing illustrates the interaction of the anionic polymeric surfactant of the invention and a commonly used petroleum sulfonate anionic surfactant, TRS-1080 referred to above. The viscosity of polymer E alone (whose preparation is described in Example 2) and of polymer E together with various amounts of TRS-1080 as shown in FIG. 1 was measured in distilled water at 30° and plotted as a function of product E concentration.

The chemical and shear stabilities of the anionic polymeric surfactants of the invention are quite high as reported in Table IV below and in FIG. 2 of the drawing. Table IV shows the thermohydrolytic stability of polymer E at low and high temperatures in distilled water and brine, and in water available in certain oil reservoirs having high salt concentrations. FIG. 2 of the drawing is a graphic display of the shear stability of polymer E at varying shear rates in distilled water.

TABLE IIIA
EFFECT OF SALT CONCENTRATION ON SOLUTION VISCOSITY

| Polymer and concn. | Shear Rate, Sec$^{-1}$ | Viscosity at R.T., cp | | |
|---|---|---|---|---|
| | | Dist. H$_2$O | 0.6% NaCl | 6.0% NaCl |
| Polymer A 0.25% | 0.38 | 730 | 14 | 14 |
| | 0.73 | 528 | 10 | 12 |
| | 1.84 | 10 | 8 | 5.3 |
| Polymer G 0.25% | 0.38 | 61 | 15 | 6.0 |
| | 0.73 | 30 | 9 | 4.0 |
| | 1.83 | 22 | 4 | 2.4 |

TABLE IIIB
EFFECT OF SALT CONCENTRATION ON SOLUTION VISCOSITY

| Polymer and concn. | Shear Rate, Sec$^{-1}$ | Viscosity at R.T., cp | | | |
|---|---|---|---|---|---|
| | | Dist. H$_2$O | 0.5% NaCl | 6% Mixed Brine | 10% NaCl |
| Polymer E 0.5% | 2.30 | 66 | — | — | — |
| | 5.75 | 49 | — | — | — |
| | 11.5 | 57 | — | — | 13.2 |
| | 23 | 45 | 7.4 | 5.6 | 8.3 |
| | 46 | 33 | 7.2 | 2.6 | 8.2 |
| | 115 | — | 6.8 | — | 4.3 |
| | 230 | — | 4.6 | — | 4.2 |

TABLE IV
THERMAL HYDROLYTIC STABILITY OF POLYMER E QUALITATIVE RESULTS

Polymer Concentration: 0.1%; Ambient pH (~5.5)

| | Appearance | | |
|---|---|---|---|
| Solvent | Initial, at R.T. | After 1 week at 180° F. | After 18 weeks at 180° F. |
| Dist. H$_2$O | Clear | Clear | Clear |
| 10% NaCl | Clear | Clear | Clear |
| 6% Mixed Brine* | Clear | Slightly turbid | Slightly turbid |
| Reservoir Water | Clear | Clear | Clear |

*Containing 3.86% NaCl, 1.54% CaCl$_2$ and 0.6% MgCl$_2$.

As will be appreciated by those skilled in the art, the present invention provides a new and improved method for achieving mobility control in waterflooding operations used in oil recovery. Water thickened with various polymeric materials is an integral part of tertiary oil recovery. Current polysaccharides and polyacrylamide thickeners have disadvantages in that the former are thermally unstable, and the latter are sensitive to salts. The anionic polymeric surfactants used as viscosifiers in accordance with the present invention have higher thermal stability, have a much lower sensitivity to salt, and are more economically attractive than the above polymeric thickeners.

The present invention is carried out in a recovery zone of a subterranean oil-bearing reservoir. As will be understood by those skilled in the art, the term "recovery zone", as used herein and in the appended claims is meant that portion of a reservoir through which oil is displaced to the production system by the injected displacing medium. The injection and production systems each may comprise one or more wells extending from the surface of the earth into the subterranean oil reservoir and such wells may be located and spaced from one another in any desired pattern. For example, the so-called "line flood" may be utilized in which case the injection and production systems comprise rows of wells spaced from one another. In this type of pattern, the recovery zone, as defined by the spaced rows of injection and production wells, generally will be that portion of the reservoir underlying the area between the spaced rows. Exemplary of other patterns which may be used are the so-called "circular flood" patterns in which the injection system comprises a central injection well and the production system comprises a plurality of production wells spaced about the injection well. Of course, the injection and production systems each may consist of only a single well in which case the recovery zone, as defined by the spaced injection and production wells, will be the portion of the reservoir underlying a generally elliptical area between these wells which is subjected to the displacing action of the injected flooding medium. The above and other patterns are well known to those skilled in the art, and for a more detailed description of such patterns reference is made to Uren, L. C., "Petroleum Production Engineering—Oil Field Exploitation," Second Edition, McGraw-Hill Book Company, New York and London, 1939, and, more particularly to the section entitled "The Waterflooding Process", appearing at pages 444–459.

It will also be recognized that the invention may be carried out utilizing one or more dually completed injection production wells of the type, for example, disclosed in U.S. Pat. No. 2,725,106 to Ralph Spearow. This arrangement sometimes may be utilized to advantage in a relatively thick oil reservoir in which it may be desirable to displace the oil in the reservoir upwardly and recover such oil from the upper portion of the reservoir. In this instance, the injection system normally would comprise the lower completion interval of one or more dually completed wells of the type described in the aforementioned patent to Spearow and the production system would comprise the upper completion interval of one or more of such wells. In this case, of course, the recovery zone would be that portion of the reservoir subject to the displacing action of the flooding medium as it moves upwardly through the reservoir. For further descriptions of other well arrangements which may be employed in waterflooding reference is made to Calhoun, J. C., Jr., FUNDAMENTALS OF RESERVOIR ENGINEERING, University of Oklahoma Press, Norman, 1960, pp. 371-376.

The anionic polymeric surfactants of this invention may be added to the flooding medium in concentrations so as to provide graded viscosity at the trailing edge of the mobility control slug or graded viscosities at both the leading and trailing edges of the mobility control slug. Alternatively, concentration of the anionic polymeric surfactant of the invention may be relatively constant throughout. Normally, the viscosity of at least a portion of the mobility control slug should be at least as great as that of the reservoir, and typically it will be within the range of from about 1 to about 4 times the viscosity of the reservoir oil.

In view of the compatibility of the anionic polymeric surfactants of the invention with divalent metal ions, a preferred application of the invention is in reservoires in which the connate water contains a significant divalent ion concentration, and in situations where the available flooding medium contains divalent metal ions inconsistant with the conventional use of hydrocarbon sulfonate surfactants. Thus, the invention finds particular utility in situations in which the reservoir waters and/or the waters employed in formulating the flooding medium exhibit a divalent metal ion concentration within the range of from 500 to 20,000 parts per million.

The anionic polymeric surfactants of the invention may be employed in accordance with the present invention in any suitable concentration depending upon the characteristics of the particular reservoir employed and such factors as surfactant consumption, e.g., by absorption, and dispersion of the surfactant into the reservoir waters. As noted above, in some cases a total concentration of as small as 0.05 percent by weight of the surfactant will be satisfactory. However, a total concentration ranging from about 0.1% to about 5% by weight, and preferably from about 1% to about 3% by weight, is normally employed. Where the anionic polymeric surfactant of the invention is employed as a co-surfactant in combination with a hydrocarbon sulfonate, the hydrocarbon sulfonate will be employed in a concentration sufficient to provide the desired surfactant-co-surfactant ratio as described previously.

While the aqueous solution of the anionic polymeric surfactant of the invention, either alone or as a co-surfactant in combination with a hydrocarbon sulfonate, may be employed as the sole displacing fluid, it will usually be injected as a discrete slug and then followed by a driving fluid. Preferably, the aqueous surfactant solution is injected in an amount of at least 0.05 pore volume. Typically, the size of the surafactant slug will be within the range of from 0.05 to 0.6 pore volume. The term "pore volume" as used herein to define the quantities of fluids injected in carrying out the invention, designates the pore volume of the formation underlying the well pattern defined by the wells comprising the injection and production systems. Where a relatively viscous mobility control fluid is employed, it normally will be injected in an amount within a range of from about 0.05 to 0.2 pore volume. Thereafter a driving fluid is injected in order to displace the previously injected fluids through the formation. The driving fluid typically may be any water which is locally available and is not compatible with the formation. The driving fluid is injected in such amount as is necessary to carry the recovery process to its conclusion.

The present invention may be carried out utilizing injection and production systems as defined by any suitable arrangements of wells, and does not require special equipment over that ordinarily employed in carrying out a waterflood. One well arrangement commonly used in waterflooding operations and suitable for use in carrying out the present invention is an integrated five-spot pattern of the type illustrated in U.S. Pat. No. 3,927,716-Burdyn et al. Other well arrangements useful in carrying out the present invention will readily occur to those skilled in the art.

It should be understood that while the present invention has been described in considerable detail with respect to certain specific embodiments thereof, it should not be considered limited to such embodiments but may be used in other ways without departure from the spirit of the invention and the scope of the appended claims.

We claim:
1. A water-soluble, polymeric reaction product of:
(1) a polymer formed of recurring structural units of the formula

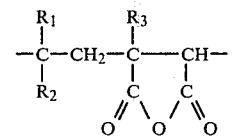

wherein $R_1$ and $R_2$ are the same or different and are hydrogen or alkyl, aryl, alkaryl or aralkyl radicals having up to 50 carbon atoms and $R_3$ is hydrogen or is of the formula

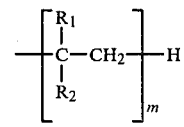

wherein $R_1$ and $R_2$ have the same meaning as hereinabove and m is from 1 to 25 and
(2) an amine of the formula $(Y)_n-R_4-NH_2$ wherein n is a whole number from 1 to 3, $R_4$ is alkaryl, aryl, alkaryl or aralkyl containing up to 50 carbon atoms and Y is selected from the group consisting of

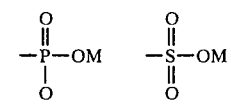

-continued

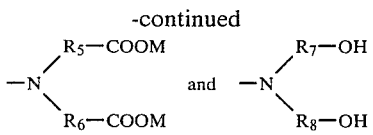 and 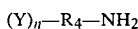

wherein $R_5$, $R_6$, $R_7$ and $R_8$ are alkylene radicals having up to 50 carbon atoms and M is hydrogen or substituted ammonium, in which polymeric reaction product at least 20 mol percent of the anhydride groups have been converted by reaction with said amine to succinimide or succinamide groups, the reaction being carried out at from about 600° C. to about 180° C.

2. The polymer of claim 1 wherein said amine has this formula

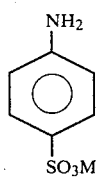

3. The polymer of claim 1 wherein $R_3$ has the structure

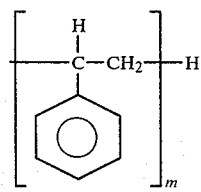

4. The polymer of claim 1 in which said amine has the formula

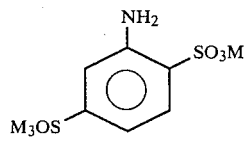

5. A water-soluble styrene-maleic anhydride copolymer of claim 1, in which from 20 mol percent to 40 mol percent of the anhydride groups have been converted to succinimide or succinamide groups by reacting said anhydride groups with said amine.

6. The copolymer of claim 5 in which said amine is of the formula $$(Y)_n-R_4-NH_2$$

wherein:
R$_4$ is alkyl, aryl, alkaryl or aralkyl containing up to 25 carbon atoms, and
Y is selected from the group consisting of

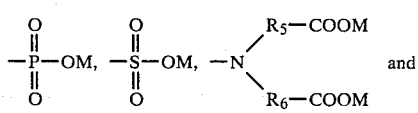 and

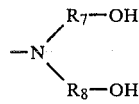

n is a whole number from 1 to 3,
$R_5$, $R_6$, $R_7$ and $R_8$ are alkylene radicals including up to 25 carbon atoms, and
M is hydrogen, an alkali or alkaline earth metal, or ammonium or substituted ammonium.

7. The copolymer of claim 6 in which said amine is of the formula

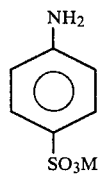

8. The copolymer of claim 6 in which said amine is of the formula

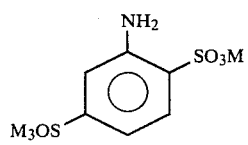

* * * * *